July 17, 1934.                R. DIETZE                1,967,080
                          RECORDING INSTRUMENT
                          Filed July 28, 1932
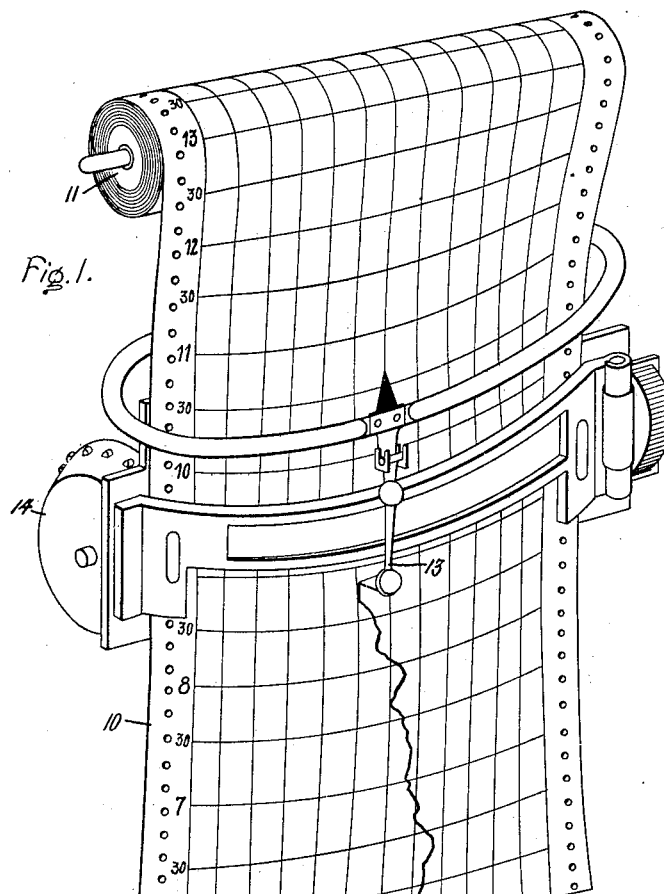
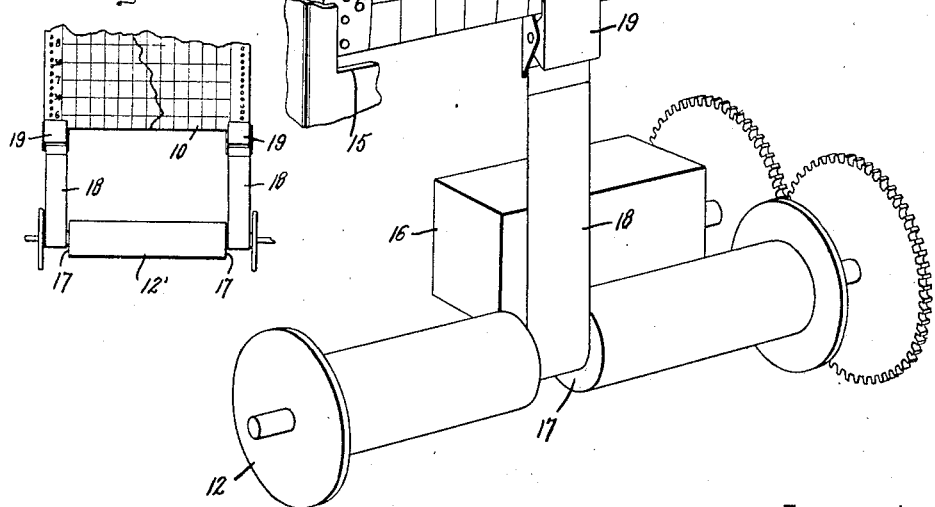
Inventor:
Richard Dietze,
by Charles E. Tullar
His Attorney.

Patented July 17, 1934

1,967,080

UNITED STATES PATENT OFFICE 1,967,080

RECORDING INSTRUMENT

Richard Dietze, Berlin-Pankow, Germany, assignor to General Electric Company, a corporation of New York Application July 28, 1932, Serial No. 625,254
In Germany September 30, 1931

2 Claims. (Cl. 234—1)

My invention relates to recording instruments, particularly those of the strip chart variety, where a continuous record is made on a chart as it travels from a supply spool to a rewinding spool past the recording pen or stylus. In such instruments, the chart may be of sufficient length to last a month or a week, but often it is desirable to sever the chart and remove the portion on which a record has been made at the end of each day or after the recording of some abnormal condition.

When a new chart is fed into the recording instrument, or when the chart has been severed and the used portion removed, it has been the usual practice to pull sufficient length of chart past the recording position to fasten to the reroll spool. Several inches of chart are thus wasted, and any record remaining on the severed end of the chart cannot be seen through the usual observing window. If the chart is provided with time graduations, as is usually the case, it is necessary to waste a length of chart corresponding to 24 hours, so as to reposition the time graduations on the chart in their proper time relation with respect to the recording pen.

My invention avoids the above mentioned disadvantages in that I provide suitable means such as one or more flexible straps having one end fastened to the reroll spool so as to be wound thereon as the spool is rotated. The other end of the strap is provided with chart securing means so as to extend to and grasp the end of the recording chart at or near the recording position. Such strap or straps take the place of the chart that was wasted in the prior arrangement, and render it unnecessary to disturb the unused portion of the chart in any way. Any record remaining on the end of the chart is left before the observation window and the refastening of the chart to the scroll spool is simplified. After a chart renewal or chart severing operation using my invention, the chart remaining in the instrument is drawn to the reroll spool by the straps which slowly wind up on the reroll spool as the chart is advanced at its normal rate of travel.

The features of the invention which are considered to be novel and patentable will be pointed out in the claims appended hereto. For a better understanding of the invention reference is made in the following description to the accompanying drawing, Fig. 1 of which illustrates parts of a strip chart recording instrument and record sheet to which my invention has been applied and Fig. 2 of which illustrates a modification of the invention where two chart fasteners are shown at either end of the reroll spool.

Referring now to Fig. 1, I have here represented sufficient parts of a recording instrument with a recording chart 10 to illustrate the present invention. The supply spool for the unused chart is represented at 11, and the reroll spool provided with the attachment of my invention is shown at 12. The chart is moved past a recording position and pen 13 and its rate of movement is controlled by means of a time-actuated drum indicated at 14. The direction of chart movement is downward. The lower limit of the chart observation window is indicated at 15. The remaining parts of the recording instrument, aside from the reroll spool, may be of normal construction and arrangement. The reroll spool may be driven by a spring motor indicated at 16, or by a slipping belt from the timing motor, as is often done, and its purpose is to rewind the chart and keep it taut. The reroll motor may supply a large part of the energy for moving the chart.

In Fig. 1 the reroll spool, shown empty, has a reduced section or recess 17 at its center and to the reduced section of the roll is fastened one end of a strap or web 18 made of cloth or other suitable flexible material. This strap is of sufficient length that it may be unwound from spool 12 and reach to the pen 13 and its free end is provided with a suitable form of spring clasp 19, or other fastening means, by means of which it may be secured to the end of the chart 10 when a new chart is fed into the instrument or when a portion of the chart on which a record has been made has been cut off and removed with a similar reroll spool. The recess 17 allows space below the periphery of the main section of the reroll spool to receive the web 18 and clasp 19, so that when the chart is drawn to the spool by the web it will wind smoothly thereon without leaving a bulge at the center which might tend to tear the chart or interfere with the rewinding operation. It is seen that the web 18 takes the place of the amount of record chart between the pen and reroll spool which is usually wasted in securing the chart to the reroll spool and adjusting the time graduations on the chart with the pen after a chart renewal or after the chart has been cut to remove a portion on which a record has been made. For example, without the web 18 it would be necessary to draw sufficient chart from spool 11 to fasten directly to spool 12 and in doing so the record, here shown before the observation window, would be hidden on the reroll spool. Then an additional amount of chart should be wound up on the reroll spool to bring the next time graduation on the chart, here shown to be about 8:50 A. M., opposite the pen 13. Thus, by my invention I save a length of chart corresponding to 24 hours when the chart is cut for removal of the record, and the record for the past few hours remaining in the instrument is not hidden from view. To further illustrate the advantage of the invention, we may cut the record chart at the 8:30 time graduation with the record sheet as here positioned and remove the record. Then, without in any way disturbing the recording apparatus or advancing the chart beyond its normal rate, we may simply pull out web 18 and fasten it to the chart at its center just below the recording pen. The rewinding operation will then continue at the normal rate, web 18 being first wound on the reduced section of spool 12 and then chart 10 on the main section of the spool. The securing of the chart in driving relation with the rewinding spool is thus simplified and the chart is guided and centered exactly with respect thereto by the web. The same type of spool may, of course, be employed as the supply spool so that the tail end of the record sheet might be fully utilized for recording purposes; but this is not so important as the use of the invention in connection with the reroll spool for reasons apparent from the foregoing explanation.

The usual reroll drive arrangement is of the variable speed variety, since if the chart advances at a uniform rate the reroll spool must rotate more slowly as the diameter of the roll thereon increases. It will thus be evident that the more rapid rotation of the reroll spool for winding up the web on the reduced section of the spool will ordinarily require no change in the usual reroll drive arrangement and at the most only an extension of the speed range thereof. However, on existing instruments where for any reason the reroll drive is not arranged to drive the reroll spool sufficiently fast to take care of the initial winding of the web thereon, I may secure the web to the spool through a spring drum or make the web of elastic material and stretch it sufficiently in fastening it to the record sheet to maintain the proper tension thereon during this initial rewinding operation.

In Fig. 2, I have represented a spool 12' having reduced portions 17 at either end and provide two webs 18 with fastening clips 19 at their ends for securing to the lateral edges of the chart 10. With this arrangement there is no possibility of the clips interfering with the recording pen in any recording position, even though exactly opposite thereto.

Having thus described my invention, I seek claims commensurate therewith without limitation as to the exact details of construction.

What I claim as new and desire to secure by Letters Patent of the United States, is:

1. In a recording instrument, a chart supply spool, a chart rewinding spool, a time graduated recording chart arranged to be fed from the supply spool to the rewinding spool, recording means for producing a record on said chart between the two spools, timing means for controlling the movement of said chart past the recording position at a rate corresponding to the time graduations on the chart, and flexible means secured to said reroll spool for connecting said spool in winding relation with the chart before the latter has been moved past the recording position a sufficient distance to be secured directly in winding relation with the reroll spool.

2. In a recording instrument, a time graduated record sheet, a recording device past which the record sheet is moved, timing means for controlling the rate of movement of said record sheet past the recording position to correspond with such time graduations, a spool for receiving and winding up the record sheet after passing the recording position and maintaining it taut while passing the recording position, and means for connecting said record sheet in driving relation with said spool before the chart has been moved past the recording position a sufficient distance to be secured directly in driving relation with said spool and for thereafter guiding the chart onto said spool and establishing direct driving relation.

RICHARD DIETZE.